Z. HUNT.
Damper.
No. 32,834. Patented July 16, 1861.
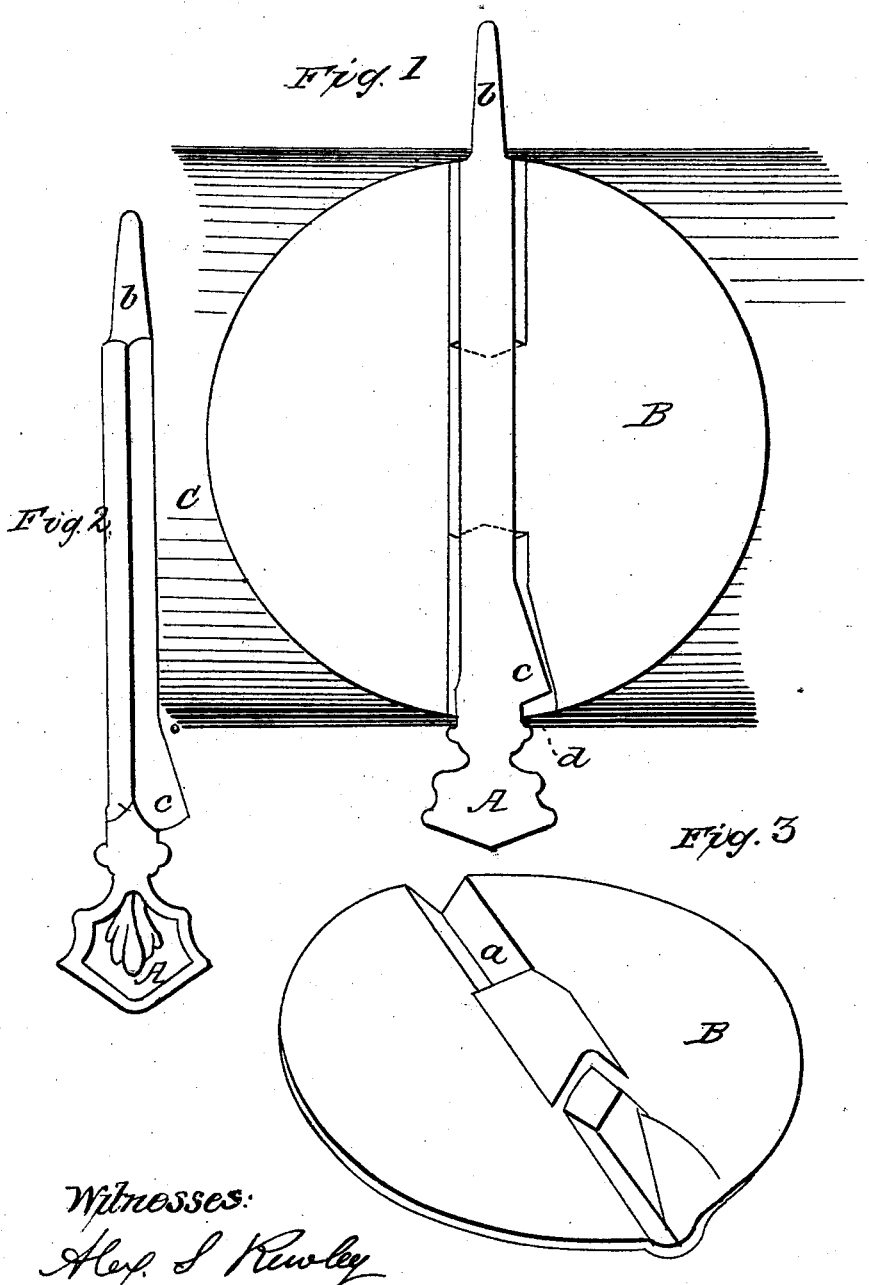
Witnesses:
Alex. S. Rowley
Refine L. Rossman
Inventor
Zebulon Hunt

UNITED STATES PATENT OFFICE.

ZEBULON HUNT, OF HUDSON, NEW YORK.

DAMPER FOR STOVEPIPES.

Specification of Letters Patent No. 32,834, dated July 16, 1861.

*To all whom it may concern:*

Be it known that I, ZEBULON HUNT, of the city of Hudson, in the county of Columbia and State of New York, have invented a new and useful Improvement in the Construction of Dampers for Stovepipes; and I do hereby declare the following to be a full, clear, and exact description of the construction and operation of the same, reference being had to the accompanying drawings, and to the letters of reference marked thereon, making a part of this specification.

Figure 1. is a longitudinal vertical section of the damper as inserted in the pipe. Fig. 2. is a full size view of the spindle or key of the damper, detached. Fig. 3. is a perspective view of the damper, (with the spindle removed), showing the groove through which it passes and the expansion at one end to accommodate the guard or flange on the spindle.

Letter A is the spindle on which the damper is suspended and by which it is operated, B. the damper plate.

C. represents the pipe.

*a.* is the alternate groove through the middle of the damper through which the spindle A passes.

*b.* is the terminal end or point of the spindle made of sufficient length to accommodate the variation in the diameters of pipes and conical or tapering.

*c.* is the flange, guard or catch on the edge or side of the spindle which prevents it from drawing out and assists in operating the damper.

*d.* is the thumb-end hole, in the pipe, for the spindle.

The nature of my invention consists in providing the spindle or turning-shaft of stove pipe dampers with one or more triangular or wedge-shaped flanges at such points within or out of the pipe and on one or both ends of the spindle so as to prevent its being withdrawn easily, permit it to revolve freely and to allow it to be inserted readily.

The present mode of constructing dampers with a knob at the terminal end of the spindle is very troublesome to insert and fasten and very liable to get out of order—frequently slipping out of place. The only fastening they have or the only method heretofore employed to keep the spindle in place has been to punch the hole sufficiently large to admit the knob and then to set back around the neck enough of the iron of the pipe to keep it from being withdrawn. This, however, frequently proves insufficient, and the knob slips through or inside the pipe, especially if the diameter of the pipe is a little greater than the length of the spindle which often occurs. Pipe intended to be of the same size will frequently vary from one quarter to half an inch in diameter. With my improved spindle this variation in the pipe makes little or no difference in its permanency, its operation, or the ease and facility of inserting it.

The spindle A of my improved damper is provided with a wedge-shaped flange or catch *c.* at one or both of its ends just within or out of the pipe. The damper plate B is provided with an alternate groove *a.* (see Fig. 3.) in or through which the spindle A is inserted. The flange *c.* serves to operate the damper when the hand is applied to the spindle for that purpose, as a catch to prevent its being easily drawn out, and as a useful and convenient device for enabling manufacturers to insert it in the pipe. The groove *a* is expanded where the flange *c.* rests or bears and is made to accommodate and fit it.

My method of inserting this damper is to punch the two holes for the spindle as usual on opposite sides of the pipe. From the margin of the hand or thumb-end hole *d.* I cut a slit in the direction of the length of the pipe of sufficient length to admit the flange *c.* then placing the damper plate B within the pipe I press the spindle through the hole *d* and groove *a* until its opposite or terminal end *b.* projects sufficiently to admit the catch or flange *c.* to just pass through or into the pipe. This of course bends inward the corners of the incision made to admit the flange. The pipe is now slipped on the mandrel and these corners pounded back to their places which closes the incision again and confines the spindle to its place, but leaving it free to revolve as required.

What I claim as my invention and desire to secure by Letters Patent of the United States is—

Providing the spindle or shaft A of stove pipe dampers with one or more wedge shaped flanges $c$. in combination with an elongated end $b$. substantially in the manner and for the purpose herein set forth.

ZEBULON HUNT.

Witnesses:
ALEX. S. ROWLEY,
REFINE L. ROSSMAN.